9319X
J. DOLHANER.
Plow.
Patented Jan. 15, 1836.
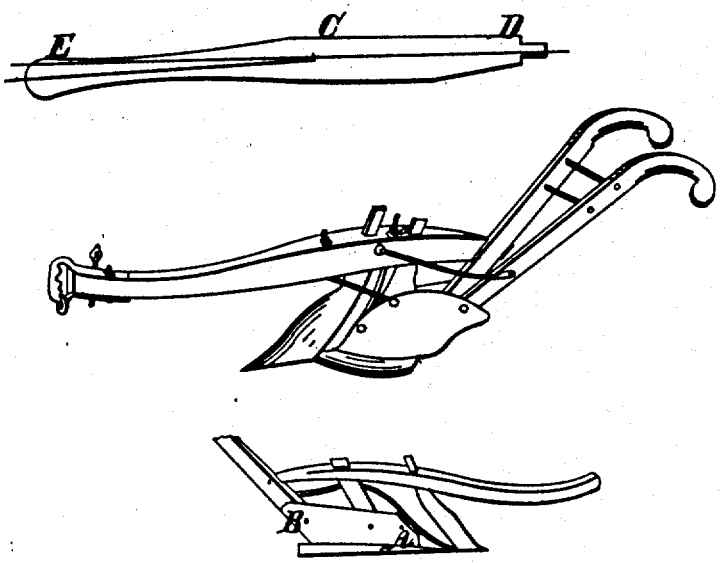
R. PETERS, PHOTO-LITHOGRAPHER, WASHINGTON, D. C.

9319X

UNITED STATES PATENT OFFICE.

JOHN DALKENER, OF CANTON, OHIO.

IMPROVEMENT IN PLOWS.

Specification forming part of Letters Patent dated January 15, 1836.

*To all whom it may concern:*

Be it known that I, JOHN DALKENER, of Canton, in the county of Stark and State of Ohio, have invented a new and useful Improvement in the Construction of Plows; and I do hereby declare that the following is a full and exact description of that part of the plow which I claim as my own invention, and which has not been previously known, to wit:

First. In the beam, which is described as follows, to wit: length of the beam, (from letter D to letter E in the drawing,) five feet six inches. The part of the drawing marked D C E represents the landside, and not the top of the beam. From letter D to letter C is two feet six inches, and on the land side straight. At letter C it curves to the left toward mold-board side, or, rather, at that point describes an obtuse angle, and thence runs straight to letter E, three feet, and one and three-fourths inch to the left of a straight line continued as between D and C. The foregoing represents a left-hand plow. For a right-hand plow it should be reversed. The effect is that it causes the plow to cut the proper quantity of land, and in a great measure to guide itself.

Second. In the mold-board and landside, which are so constructed that the landside enters a groove in the mold-board at such a distance from the point of the latter as not to weaken it, and is riveted so as to give permanency and strength, whereas, according to the old modes of constructing, the landside is merely lapped on the mold-board for reference. (See drawing at letter A.)

Third. In that part of the landside which is fastened to the handle. The particular improvement consists in this, that the upper part of the back end projects backward in such a manner as to strengthen the handle by covering it. (See drawing at letter B.)

JOHN DALKENER.

Witnesses:
HIRAM GRISWOLD,
GEO. DUNBAR.